Nov. 19, 1929. W. A. F. PFANHAUSER 1,735,878
DEVICE FOR MEASURING THE CURRENT DENSITIES OF GALVANIC BATHS
Filed May 7, 1928
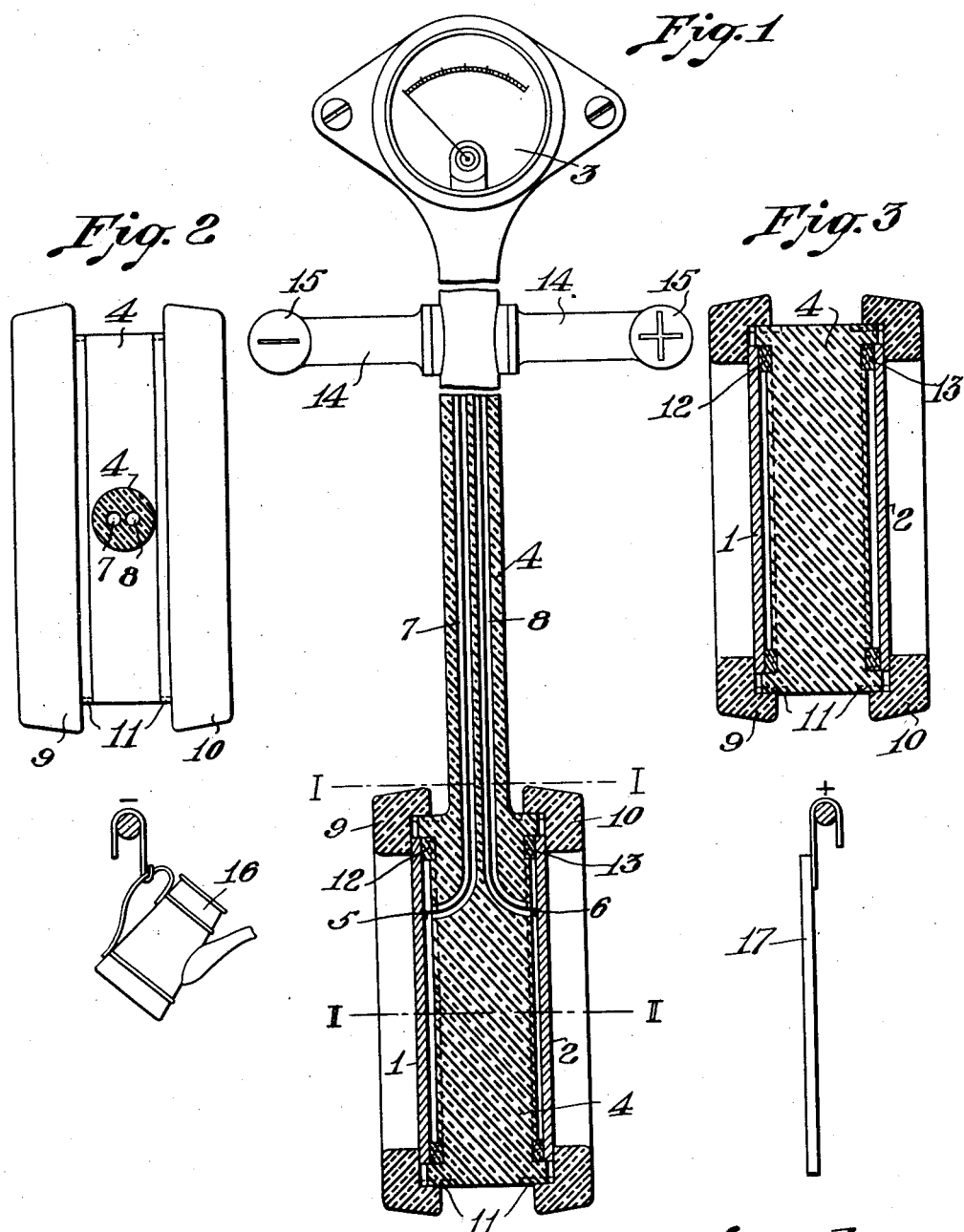

Patented Nov. 19, 1929

1,735,878

UNITED STATES PATENT OFFICE

WILHELM ANTON FRANZ PFANHAUSER, OF LEIPZIG, GERMANY

DEVICE FOR MEASURING THE CURRENT DENSITIES OF GALVANIC BATHS

Application filed May 7, 1928, Serial No. 275,598, and in Germany October 28, 1927.

The present invention concerns an improved device for measuring accurately and rapidly the current densities of galvanic baths in which electroplating or similar operations are being carried out.

One of the objects of the present invention is to provide an instrument, that, in conjunction with a galvanometer connected thereto, will give accurate readings of the current density traversing the electrolyte of a galvanic bath.

Another object of the invention is to provide an instrument that will measure accurately the current density in galvanic baths by means comprising two auxiliary electrodes connected together through a small ammeter, thereby interrupting a fraction of the current lines in a field of such current lines located between the working electrodes of a galvanic bath; the auxiliary electrodes bearing such relationship with each other that the current density of the bath being tested can either be calculated from the ammeter readings obtained, or be read directly by suitable scales added to or superimposed upon the scale of the said ammeter.

Another object of the present invention is to provide an instrument of the type outlined above, in which electrolytic connection between the auxiliary electrodes of said instrument is effectively prevented.

A still further object of the present invention is to provide an instrument, which, upon simple immersion into the galvanic bath whose current densities are to be measured, will give direct readings in current density per given surface area of electrodes, either in amperes per square decimeter, or per square inch, or similar units, as may be desired.

A further object of the invention is to provide an instrument that, by simple immersion into a bath in which electrolysis is being carried out, will give readings directly in terms of thickness of metal deposited by said bath per given period of time.

Other objects of the present invention will appear in connection with the description which follows, and the drawings that form a part of the present specification.

In the drawings accompanying the present specification,

Figure 1 is a vertical sectional view of one exemplification of the present invention showing the same as it would appear in use, and showing a cathode and an anode in a plating bath;

Fig. 2 is a horizontal section of the device shown in Fig. 1, along the line II—II of said Fig. 1; and Fig. 3 is a horizontal section along the line III—III of Fig. 1.

In all galvano-technical operations it is important to ascertain, in addition to the quality of the galvanic deposits, the thickness of the deposit obtained on the cathodes in a predetermined period of time. This, as is well known, depends, with given bath compositions, temperatures and so forth, on the density of the current used. With articles of simple shape, such as sheets or the like, the current density which exists in a galvanic bath was hitherto ascertained by dividing the current strength passing through the bath, expressed numerically in amperes, by the number of square decimeters of deposit area suspended in the bath and forming the cathode thereof.

In galvanic baths, however, an entirely uniform current density is only obtained in rare instances. Usually it is not possible to provide for an entirely homogeneous field of current lines. The current densities therefore frequently vary considerably in different parts of the bath, and the voltages prescribed for use with galvanic baths are only under very definite provisions a measure for the current densities existing at the cathode. In galvano-technology there has for a long time been an urgent necessity for providing a device by means of which it would be possible to ascertain the current densities existing in the baths in a definite manner, without requiring long and tedious calculations during the operation of electro-deposition. Suggestions have already been made to measure the current strength on a comparative member, by measuring the current which flows to said comparative member. By making said member, which was connected up as the cathode, of a surface area of 1 square decimeter, thereby it was possible to ascertain the current density existing at the point in which the galvanic bath where said member was inserted. As soon as such a comparative body, however, came into contact with an article suspended adjacent thereto and which article was also connected up as cathode, this indication of current density was no longer accurate, and the indication of the ammeter connected to such a device could no longer be regarded as normal for the current density per unit area of cathode surface, as in this manner it would indicate a larger current density, so that the indication of the ammeter in such case could no longer be depended upon to indicate accurately the current density in the bath being tested.

According to the present invention it is possible in a simple manner to ascertain accurately the current density existing at any suitable point in the bath by the simple process of inserting an instrument comprising two auxiliary electrodes between the actual operating electrodes of a galvanic bath.

As shown in the accompanying drawings, two auxiliary electrodes 1 and 2, rigidly spaced apart by an insulating block 4, are respectively connected to an ammeter 3 by the wires 5 and 6. The electrode 2, which for example is intended to face the row of anodes 17 of the bath when the instrument is employed, as will be more fully described, is made the cathode, whilst the electrode 1, which then faces the cathode 16 (shown as an article being plated), is made the anode. Care must be taken that the current intercepted by the electrode 2, that is to say the current lines which traverse the bath from the anode to the cathode, cannot pass from the auxiliary electrode 2 to the auxiliary electrode 1 by electrolytic conduction. For this purpose there are provided current-line deflecting frames of non-conducting material 9 and 10. The frames are fastened to the central insulating body 4 by means of the grooves 11 which cooperate with projections on the frames 9 and 10. The wires 5 and 6, leading to the ammeter 3, pass through a pipe 7, which is preferably also provided with an insulating layer 8. This pipe may be conventional, of metal, covered with insulating material, or be made integral with the insulating piece 4. By means of this pipe the actual measuring apparatus comprising the auxiliary electrodes 1 and 2 may be inserted to a suitable depth into the galvanic bath. Resilient gaskets 12 and 13 are placed between the center body 4 and the electrodes 1 and 2.

In order to enable the readings of the ammeter, which is preferably constructed as a rotary coil instrument, to be read off correctly when the zero point is not in exactly the middle of the scale, it is necessary to dip this device into the bath in a definite direction, so that the plate 1 receives the current passing from the anodes. For this purpose a direction pointer 14 is provided at the top of the supporting pipe 7, which pointer clearly indicates, for example by the signs 15 + and — at the ends thereof, in which position the device must be used in relation to the anodes 17 and cathodes 16 in the bath. When the apparatus is dipped into the bath the ammeter will indicate the current strength which is taken up and again passed on by the electrodes 1 and 2, being consequently interposed in the path of the current in the bath. If the auxiliary electrodes 1 and 2, for example, have an area of 1 square decimeter, then the current strength indicated by the ammeter will simultaneously indicate the current density existing at this point in terms of amperes per square decimeter. If the initial surface of the auxiliary electrodes 1 and 2, is made smaller, as for example, only one-half square decimeter. The ammeter, if current densities are to be read correctly therefrom, is correspondingly graduated, that is to say, that if one ampere flows through the ammeter when the area of the auxiliary electrode is one-half square decimeter, then the ammeter at the point at which one ampere is indicated, will indicate a current strength of two amperes and so forth.

This method of graduation only applies to baths in which there is no polarization at the electrodes, as is the case with copper baths, acidified by means of sulphuric acid, acid zinc baths and the like. If, for example, it is necessary to examine baths in which polarization takes place at the electrodes, then the graduation of the ammeter must be effected with due regard to the polarization, which also occurs at the auxiliary electrodes, so that when reading the current collected by the device this polarization is duly considered. It is also possible to provide the ammeter with out difficulty with a second scale, from which the thickness of deposit obtained in a predetermined period of time may be read directly, as for example the thickness of plating deposited per hour, in the bath being tested; or a scale may be provided from which the number of hours necessary for obtaining a definite thickness of deposit may be read, for example 0.1 m. m. in a given bath. It will be understood that only one of these scales need be graduated, or two or three comparative scales may be arranged simultaneously on the ammeter.

In copper baths, for example, the auxiliary electrodes which are used are sheets of copper, in nickel baths, they are sheets of nickel, in chromium baths, they are sheets of lead, and so forth. It will be understood that for every type of galvanic bath it is only possible to use a device specifically graduated for the particular bath in question, and provided with the corresponding auxiliary electrodes.

It is possible in this manner to measure and control readily the number of current lines existing per unit of surface on the basis of an indication of current density, and this device forms a valuable auxiliary medium, particularly where the control of the current densities which are used are of considerable importance, and particular effects during electrodeposition, such as obtaining predetermined thicknesses of deposit within a predetermined period of time, or the production of a gloss in so far as this depends upon the maintenance of a predetermined current density, are to be controlled during the plating operation.

Other methods of construction, and other means for connecting the electrodes 1 and 2 with an instrument for ascertaining the current passing from electrode 1 to electrode 2 are to be construed as being within the scope of the present invention, for which the following claims are made.

I claim:

1. A device for measuring the current densities in galvanic baths, comprising two electrodes, insulating means whereby said electrodes are effectively insulated from each other, an ammeter, electrical connection between said electrodes through said ammeter, and means for preventing electrolytic connection between said electrodes.

2. A device for measuring the current densities in galvanic baths, comprising two electrodes spaced apart in parallel relationship, insulating material interposed between and in contact with said electrodes, an ammeter, electrical connection between said electrodes through said ammeter whereby current passing from one electrode to the other may be measured, and means for preventing electrolytic connection between said electrodes.

3. A device for measuring the current densities in galvanic baths, comprising two electrodes disposed in parallel and spaced apart, insulating material between said electrodes and in contact with the inner surfaces thereof, an ammeter, electrical connection between said electrodes through said ammeter, means for preventing electroyltic connection between said electrodes, said means comprising insulating frames around said electrodes.

4. A device for measuring the current density of galvanic baths, comprising a strip of insulating material having parallel sides, conducting electrodes affixed to opposite sides of said insulating material, an ammeter, electrical connection between said electrodes through said ammeter, said connections comprising wires connected to said electrodes, insulating frames around said insulating strip and electrodes whereby electrolytic connection between the electrodes is prevented, and indicating means whereby the proper insertion of said device into said baths may be ascertained.

In witness whereof, I have hereunto subscribed my name.

WILHELM ANTON FRANZ PFANHAUSER.